(12) United States Patent
Varkey et al.

(10) Patent No.: US 8,929,702 B2
(45) Date of Patent: Jan. 6, 2015

(54) MODULAR OPTO-ELECTRICAL CABLE UNIT

(75) Inventors: Joseph Varkey, Sugar Land, TX (US); Vladimir Hernandez-Solis, Stafford, TX (US); Marwan Moufarrej, Dubai (AE)

(73) Assignee: Schlumberger Technology Corporation, Sugar Land, TX (US)

( * ) Notice: Subject to any disclaimer, the term of this patent is extended or adjusted under 35 U.S.C. 154(b) by 829 days.

(21) Appl. No.: 11/751,349

(22) Filed: May 21, 2007

(65) Prior Publication Data

US 2008/0289851 A1    Nov. 27, 2008

(51) Int. Cl.
G02B 6/26        (2006.01)
G02B 6/44        (2006.01)
H01B 7/04        (2006.01)

(52) U.S. Cl.
CPC .............. *G02B 6/4416* (2013.01); *H01B 7/046* (2013.01)
USPC .......................................... 385/109; 385/100

(58) Field of Classification Search
USPC .................................................. 385/100, 109
See application file for complete search history.

(56) References Cited

U.S. PATENT DOCUMENTS

| | | | | |
|---|---|---|---|---|
| 1,921,606 A | * | 8/1933 | Cremer | 174/103 |
| 1,937,054 A | * | 11/1933 | Cremer et al. | 174/26 R |
| 2,261,742 A | * | 11/1941 | Matsumoto | 174/21 R |
| 2,927,954 A | | 3/1960 | Ellsworth | |
| 3,115,542 A | | 12/1963 | Palandri et al. | |
| 3,602,632 A | | 8/1971 | Ollis | |
| 3,639,674 A | | 2/1972 | Stier | |
| 3,784,732 A | | 1/1974 | Whitfill | |
| 4,160,872 A | * | 7/1979 | Lundberg et al. | 174/101.5 |
| 4,389,645 A | * | 6/1983 | Wharton | 340/854.7 |
| 4,440,974 A | | 4/1984 | Naudet | |
| 4,645,298 A | | 2/1987 | Gartside, III | |
| 4,654,476 A | | 3/1987 | Barnicol-Ottler | |

(Continued)

FOREIGN PATENT DOCUMENTS

| | | |
|---|---|---|
| EP | 1004914 A1 | 5/2000 |
| JP | 61013208 A | 1/1986 |

(Continued)

OTHER PUBLICATIONS

S. M. Lebedev, O.S. Gefle, Yu.P. Pokholkov and V.I. Chichikin, "The Breakdown Strength of Two-Layer Dielectrics", Tomsk Polytechnic University, Tomsk, Russia #4.304. p. 2, High Voltage Engineering Symposium, Aug. 22-27, 1999.

(Continued)

*Primary Examiner* — Charlie Peng
*Assistant Examiner* — Mary El Shammaa
(74) *Attorney, Agent, or Firm* — Trevor Grove

(57) ABSTRACT

A modular cable unit for oilfield wireline includes multiple cable modules. The cable modules are interchangeable to achieve a modular cable unit with desired telemetry and electrical properties to suit a specific application. The cable modules can be an optical fiber module, a power cable or an opto-electrical module assembly. The cable modules that make up the modular cable unit are preferably arranged in a triad configuration defining a substantially triangular tangent periphery and are surrounded by a polymeric casing having a circular periphery. The triad configuration of the modular cable unit contributes to an improved mechanical strength. A floating-tube type optical fiber element with improved mechanical strength is also disclosed.

14 Claims, 7 Drawing Sheets

(56) References Cited

U.S. PATENT DOCUMENTS

| | | | |
|---|---|---|---|
| 4,657,342 A | 4/1987 | Bauer | |
| 4,658,089 A | 4/1987 | Guzy | |
| 4,675,474 A * | 6/1987 | Neuroth | 174/102 R |
| 5,086,196 A | 2/1992 | Brookbank | |
| 5,495,547 A | 2/1996 | Rafie et al. | |
| 5,761,361 A * | 6/1998 | Pfandl et al. | 385/100 |
| 5,982,965 A * | 11/1999 | Cheron et al. | 385/100 |
| 6,060,662 A | 5/2000 | Rafie | |
| 6,195,487 B1 | 2/2001 | Anderson | |
| 6,201,191 B1 | 3/2001 | Yorita | |
| 6,236,789 B1 | 5/2001 | Fitz | |
| 6,287,455 B1 | 9/2001 | Whitmore | |
| 6,297,455 B1 | 10/2001 | Wijnberg | |
| 6,343,173 B2 * | 1/2002 | Hordvik et al. | 385/102 |
| 6,403,889 B1 | 6/2002 | Mehan | |
| 6,445,859 B1 * | 9/2002 | Witt | 385/109 |
| 6,463,199 B1 | 10/2002 | Quinn et al. | |
| 6,600,108 B1 | 7/2003 | Mydur et al. | |
| 6,924,436 B2 | 8/2005 | Varkey et al. | |
| 6,960,724 B2 | 11/2005 | Orlet et al. | |
| 6,968,106 B2 * | 11/2005 | Chastain et al. | 385/112 |
| 6,973,246 B2 * | 12/2005 | Bocanegra et al. | 385/113 |
| 7,005,583 B2 | 2/2006 | Varkey et al. | |
| 7,009,113 B2 | 3/2006 | Varkey | |
| 7,119,283 B1 | 10/2006 | Varkey et al. | |
| 7,170,007 B2 | 1/2007 | Varkey et al. | |
| 7,179,019 B2 * | 2/2007 | Seto et al. | 405/183.5 |
| 7,188,406 B2 | 3/2007 | Varkey et al. | |
| 7,259,331 B2 | 8/2007 | Sridhar et al. | |
| 7,288,721 B2 | 10/2007 | Varkey et al. | |
| 8,213,756 B2 * | 7/2012 | Herbst | 385/109 |
| 2002/0159726 A1 | 10/2002 | Brown et al. | |
| 2003/0099446 A1 * | 5/2003 | Witt et al. | 385/109 |
| 2004/0118590 A1 | 6/2004 | Head | |
| 2005/0117858 A1 * | 6/2005 | Lee et al. | 385/100 |
| 2005/0194578 A1 * | 9/2005 | Morris | 254/134.3 FT |
| 2005/0281517 A1 * | 12/2005 | Wessels et al. | 385/109 |
| 2006/0182398 A1 * | 8/2006 | Dowd et al. | 385/100 |

FOREIGN PATENT DOCUMENTS

| | | |
|---|---|---|
| JP | 492110 | 3/2002 |
| NL | 1019447 C2 | 6/2003 |
| WO | 2007066146 A2 | 6/2007 |

OTHER PUBLICATIONS

M.M.A. Salama, R. Hackam, Fellow and A. Y. Chikhani, Sr., "Instructional Design of Multi-Layer Insulation of Power Cables", Transactions on Power Systems, vol. 7, No. 1, Feb. 1992, pp. 377-382.
Chinese Second Office Action for Chinese Application No. 200810085459.0 dated Mar. 20, 2012.
Chinese Third Office Action for Chinese Application No. 200810085459.0 dated Dec. 7, 2012.
Chinese Fourth Office Action for Chinese Application No. 200810085459.0 dated Jul. 1, 2013.
Chinese Fifth Office Action for Chinese Application No. 200810085459.0 dated Dec. 25, 2013.
International Search Report and the Written Opinion for International Application No. PCT/IB2008/051589 dated Jan. 14, 2009.

* cited by examiner

MODULAR OPTO-ELECTRICAL CABLE UNIT

FIELD

The present disclosure relates generally to opto-electrical cables, and more particularly to modular opto-electrical cable units and their manufacturing methods.

BACKGROUND

The statements in this section merely provide background information related to the present disclosure and may not constitute prior art.

As an oil well is being drilled, a sonde is usually lowered periodically into the borehole to measure characteristics of the earth formations it traverses. Typically, a logging cable supports and moves the sonde within the borehole, carries power for the sonde, and relays control instructions and data between the sonde and instrumentation and control facilities at the surface of the earth. As measurements and measuring instruments have become more sophisticated, there is a demand for cables with high power capabilities and higher data transmission rates.

To provide a cable with strong mechanical strength, a hepta cable consisting of six conductors around a central conductor is provided. While a hepta cable provides improved mechanical stability, the hepta cable has limited telemetry capabilities and power transmission capabilities.

A cable of a quad configuration is known to have high-power capabilities. As shown in FIG. 14, a wireline cable 200 of a quad configuration includes four large high power conductors 202 (only one indicated). Four smaller helical conductors 204 (only one indicated) are disposed in the cavities formed in adjoined large high power conductors 202. The interstices formed between the large high power conductors 202 and the smaller conductors 204 may be filled with a filler material to bind the conductors together. After the filler material 206 fills in the interstices, a tape 208 is then wrapped around the conductors 202, 204 and the filler material 206 to form a cable core. A protective jacket 210 including two layers of armor wires 212 and 214 are then wrapped around the cable core for providing a desirable mechanical strength, thereby forming a cable assembly 200.

The cable of a quad configuration, however, has disadvantages in mechanical instability. During the well logging process, the smaller optical conductors tend be pushed further into the cavities between the adjoined larger power conductors and are susceptible to damage and short circuit.

Accordingly, there is a need for an opto-electrical cable having improved mechanical strength, mechanical stabilities, power transmission and telemetry capabilities. Further, as more complex and versatile downhole tools having distinct requirements are used in oil exploration, there is also a need for an opto-electrical cable which can be easily manufactured to have desired telemetry and power transmission capabilities to suit a specific application.

SUMMARY

In one preferred form, an optical fiber element includes at least one optical fiber, a tube surrounding the at least one optical fiber and an outer layer coaxially disposed around the tube. The optical fiber is loosely received inside the tube. The tube is movable along a central axis of the tube relative to the outer layer.

In another form, an optical fiber element includes at least one optical fiber and a body including a first portion and a second portion. The first portion and the second portion cooperatively enclose the at least one optical fiber therein.

In another form, an optical fiber element includes at least one optical fiber or optical fiber component and a plurality of copper or nickel coated copper wires surrounded by a plurality of polymeric layers.

In still another form, a cable module includes a primary cable package including only three primary cable elements of substantially equal diameters, and a casing enclosing the primary cable package. The three primary cable elements are adjoined to form a substantially triangular tangent periphery.

In another form, a cable module includes an electrical conductor composed of a plurality of copper wires. The electrical conductor is extruded with suitable insulating material.

In still another form, a modular cable unit includes a plurality of cable modules and a casing encasing the plurality of cable modules. The cable modules are interchangeable and are selected to achieve predetermined telemetry and electrical capabilities.

In yet still another form, a method of manufacturing a cable module includes arranging three primary cables to form a substantially triangular shape; and applying a casing around the three primary elements to form the cable module.

In yet still another form, a method of manufacturing a modular cable unit includes preparing a plurality of cable modules having different telemetry, optical and electrical characteristics; and adjoining the plurality of cable modules to form a modular cable unit having predetermined telemetry, optical and electrical characteristics.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 7:
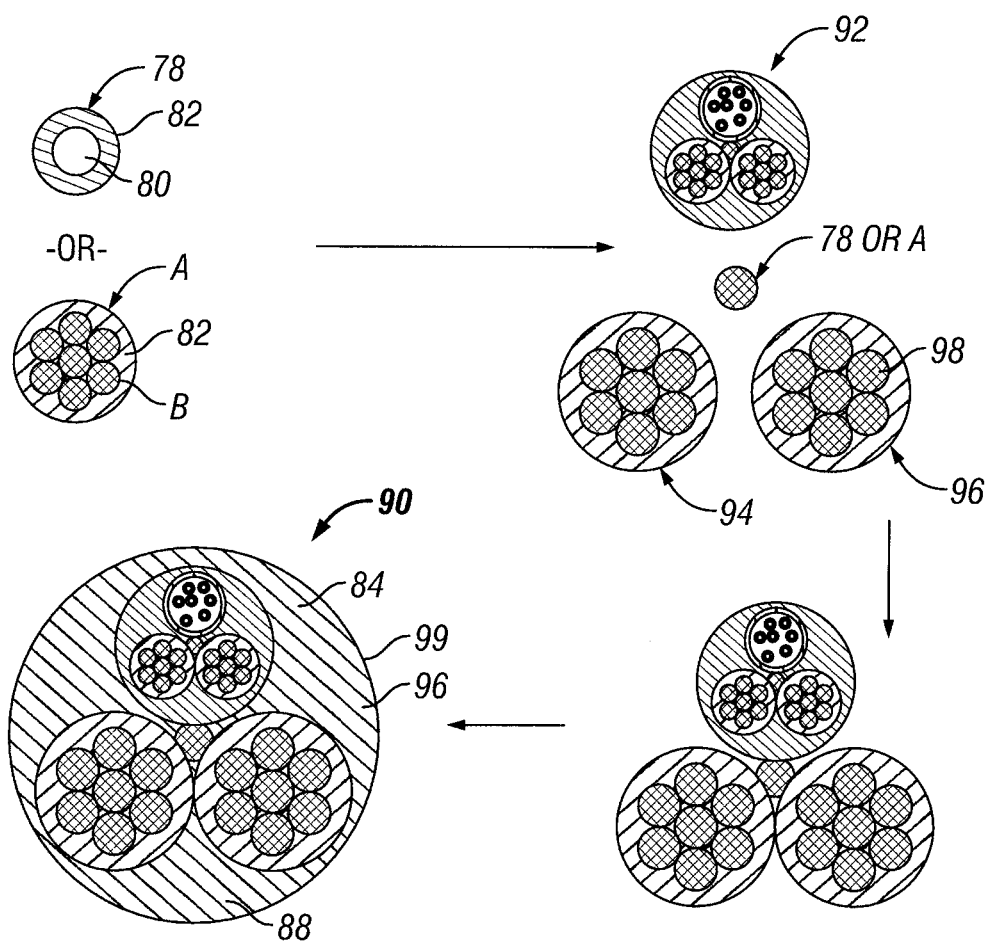
Figure 8:
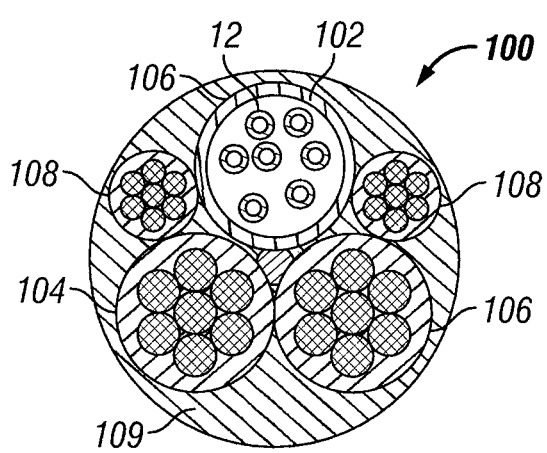
Figure 9:
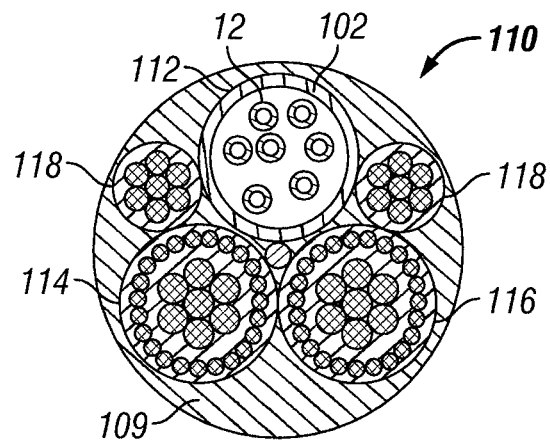
Figure 10A:
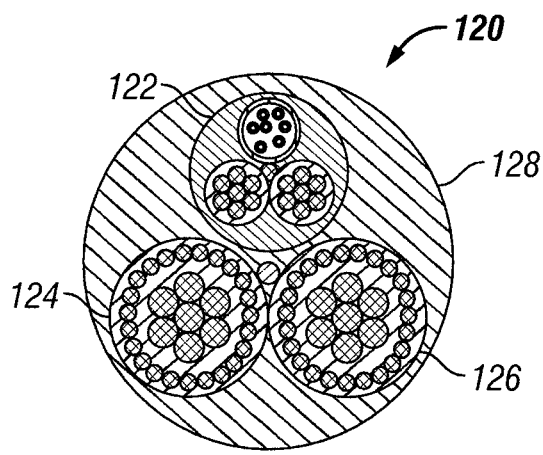
Figure 10B:
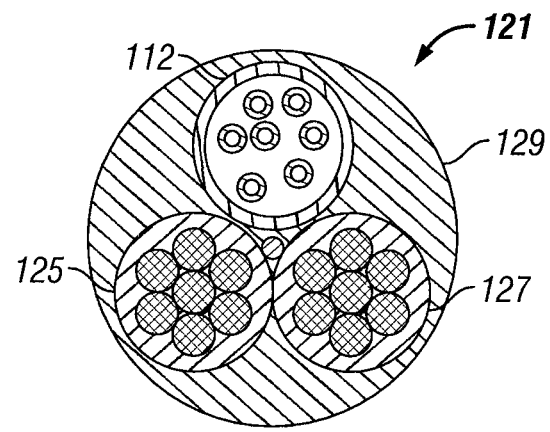
Figure 11:
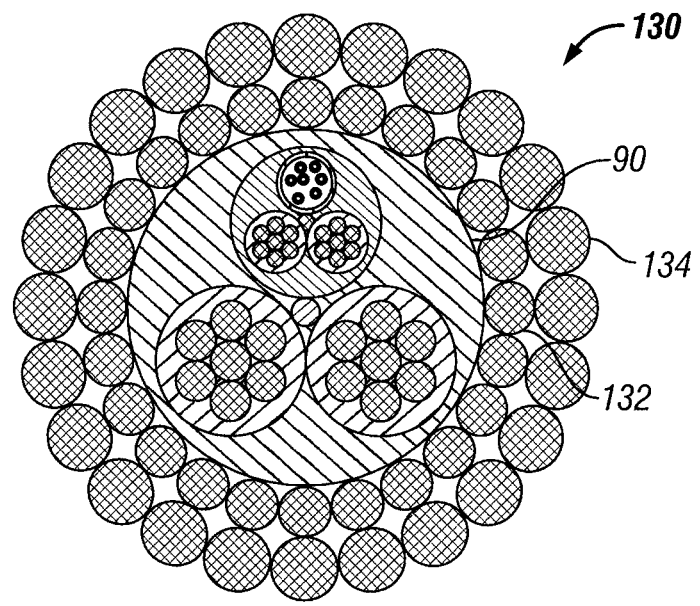
Figure 12:
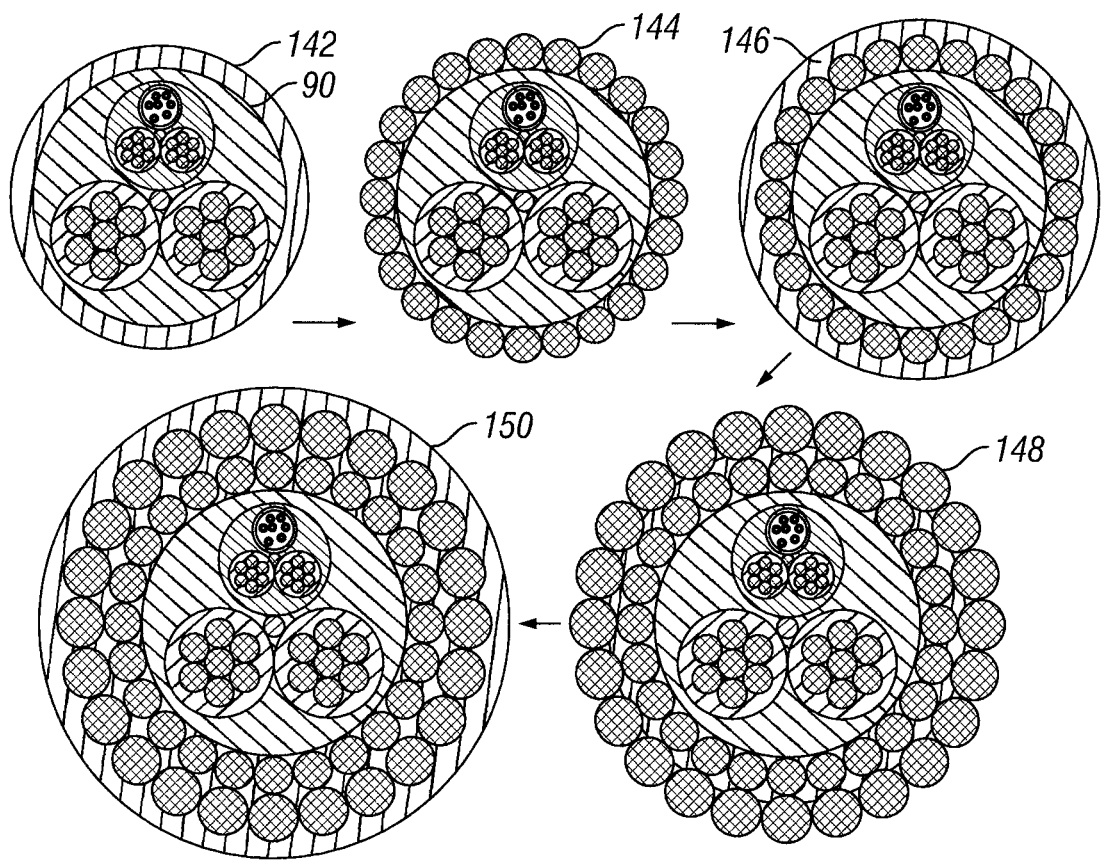
Figure 13:
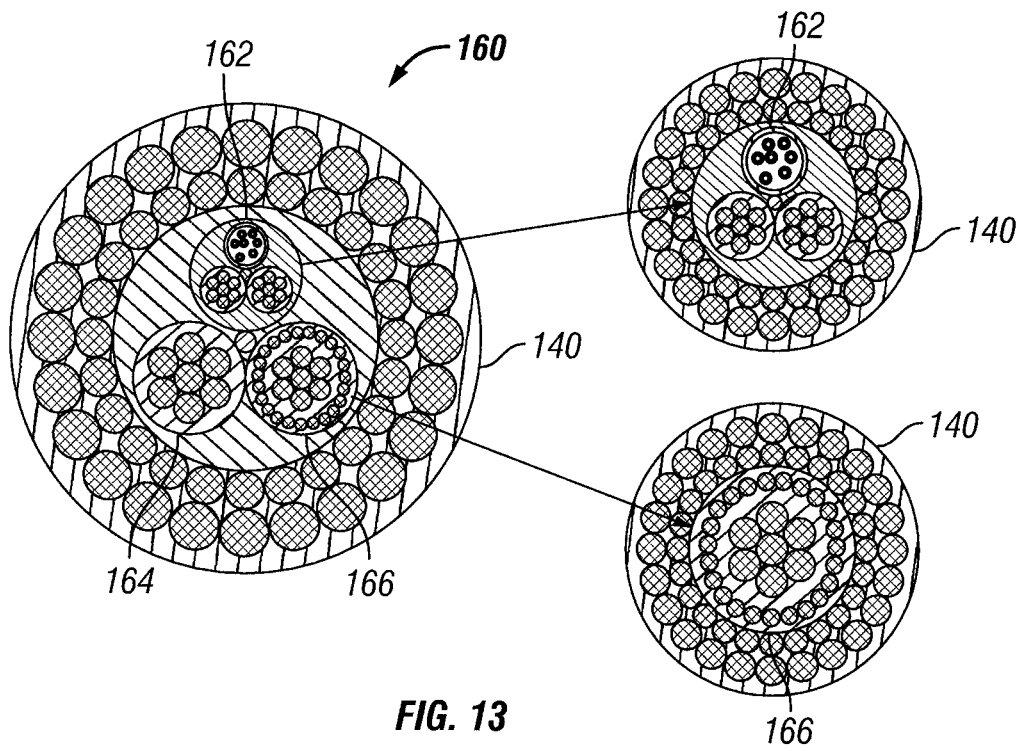
Figure 14:
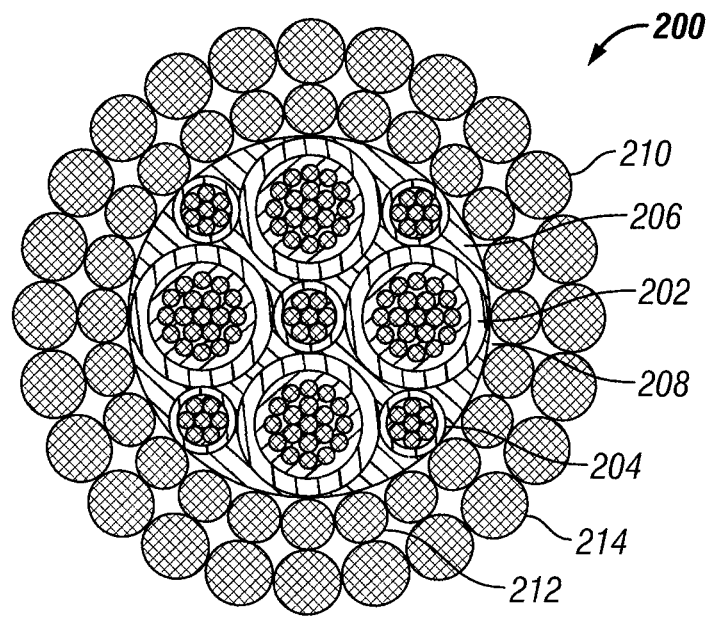

FIG. 7 a cross-sectional view of a modular cable unit, illustrating sequential steps of manufacturing the modular cable unit;

FIG. 8 is a cross-sectional view of a modular cable unit in accordance with the teachings of the present disclosure;

FIG. 9 is a cross-sectional view of a modular cable unit in accordance with the teachings of the present disclosure;

FIGS. 10a and 10b are cross-sectional views of modular cable units in accordance with the teachings of the present disclosure;

FIG. 11 is a cross-sectional view of a modular cable unit with a strength member in accordance with the teachings of the present disclosure;

FIG. 12 is a cross-sectional view of a modular cable unit with an armoring system, illustrating sequential steps of applying the armoring system around the modular cable unit;

FIG. 13 is a view showing how the cable modules are used individually or in their combination; and FIG. 14 is a cross-sectional view of a prior art wireline quad cable.

Corresponding reference numerals indicate corresponding parts throughout the several views of the drawings.

DETAILED DESCRIPTION

The following description is merely exemplary in nature and is not intended to limit the present disclosure, application, or uses. It should be understood that throughout the drawings, corresponding reference numerals indicate like or corresponding parts and features.

At the outset, it should be understood that the term "cable module" used throughout the specification refers to a cable or a cable assembly that can be used individually or combined with other cables or cable assemblies to form a modular cable unit. The cable modules that make up the modular cable unit are interchangeable for different applications. The cable modules can be optical fiber conductors, optical fiber conductor assemblies, power conductors, power conductor assemblies, hybrid opto-electrical conductor assemblies and any other conductors or conductors assemblies having predetermined telemetry, electrical or optical characteristics.

Optical Fiber Element

Figure 1:
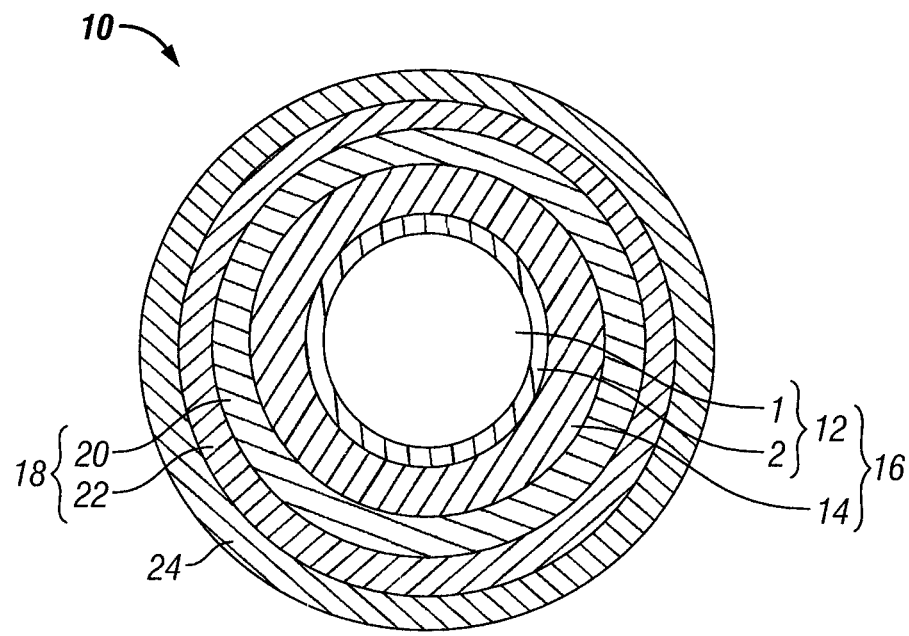
FIG. 1 is a cross-sectional view of an optical fiber component constructed in accordance with the teachings of the present disclosure.

Referring to FIG. 1, an optical fiber component constructed in accordance with the teachings of the present disclosure is illustrated and generally indicated by reference numeral 10. The optical fiber component 10 comprises an optical fiber 12, an insulating layer 14 disposed around the optical fiber 12, a buffer layer 18 surrounding the insulating layer 14, and an outer silicon layer 24 surrounding the buffer layer 18. The optical fiber 12 comprises a core 1 and a cladding 2.

The optical fiber 12 and the insulating layer 14 form an optical fiber ensemble 16. The insulating layer 14, which preferably is formed from carbon, is hermetic and capable of withstanding high-temperatures. The insulating layer 14 is placed over the optical fiber 12 and provides a barrier against $H_2O$ and $H^+$, thereby protecting against hydrogen attack and hydrolysis. The insulating layer 14 also increases the proof stress level of the optical fiber component 10 and resistance to static fatigue, thereby increasing the service life of the optical fiber component 10.

Preferably, the optical fiber 12 has a high numerical aperture and a smaller core 1 than conventional telecommunications fibers. A high numerical aperture fiber requires a smaller fiber core size to maintain a constant cutoff wavelength. High NA fibers reduce their susceptibility to optical signal attenuation due to micro and macro bendings.

The buffer layer 18 surrounds the optical fiber ensemble 16 and is in intimate contact with the optical fiber ensemble 16. The buffer layer 18 is called a "tight buffer" because the buffer layer 18 is in intimate contact with the optical fiber ensemble 16, as opposed to a "loose buffer" which may take the form of a conduit and loosely contains the optical fiber ensemble 16. The buffer layer 18 preferably includes a silicon layer 20 extruded over the optical fiber ensemble 16 and a PFA (perfluoroalkoxy) layer 22 extruded over the silicon layer 20.

The outer silicon layer or other suitable soft polymers 24 is extruded over the buffer layer 18 to cushion the optical fiber ensemble 16 and distribute any compressive load on the optical fiber ensemble 16 from outside. With this construction, the optical fiber cable 10 is less susceptible to tensile stress and bending stress, thereby reducing signal attenuation.

Figure 2:
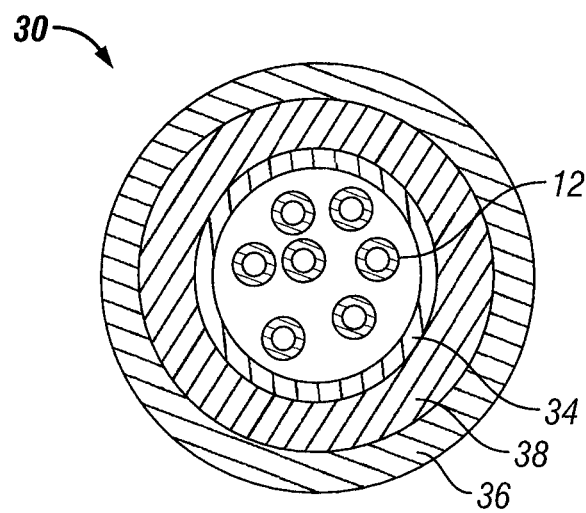
FIG. 2 is a cross-sectional view of an optical fiber element constructed in accordance with the teachings of the present disclosure.

Referring to FIG. 2, an alternate optical fiber element according to the teachings of the present disclosure is illustrated and generally indicated by reference numeral 30. The optical fiber element 30 includes a plurality of optical fibers 12 (only one indicated), a tube 34 within which the plurality of optical fibers 12 are loosely received, and an outer polymer layer 36 coaxially provided around the tube 34. The tube 34 is made of metal or polymers for the protection of the optical fibers 12 received therein. The outer polymer layer 36 improves the mechanical strength.

At least one intermediate layer 38 is provided between the tube 34 and the outer polymer layer 36. The intermediate layer 38 may be formed of gel or soft polymers, fabric, foamed and filled soft polymers or combinations thereof. The intermediate layer 38 allows the tube 34 to be "floatingly" received within the outer polymer layer 36 so that the "floating" tube 34 can slide along a central axis of the tube 34 relative to the outer polymer layer 36 in response to tension exerted on the optical fiber element 30. Since a significant amount of the tensile and/or bending stress applied to the optical fiber element 30 is used to cause the sliding movement of the "floating" tube 34, the optical fibers 12 are more effectively protected within the tube 34 against tensile and/or bending stress. Therefore, the fatigue of the optical fiber element 30 is significantly improved. It is not necessary to apply a carbon coating on the optical fibers 12 to improve the strength of the optical fibers 12. The tube also may also provide protection against $H_2O$ and $H^+$, thereby protecting against hydrogen attack and hydrolysis.

Figure 3:
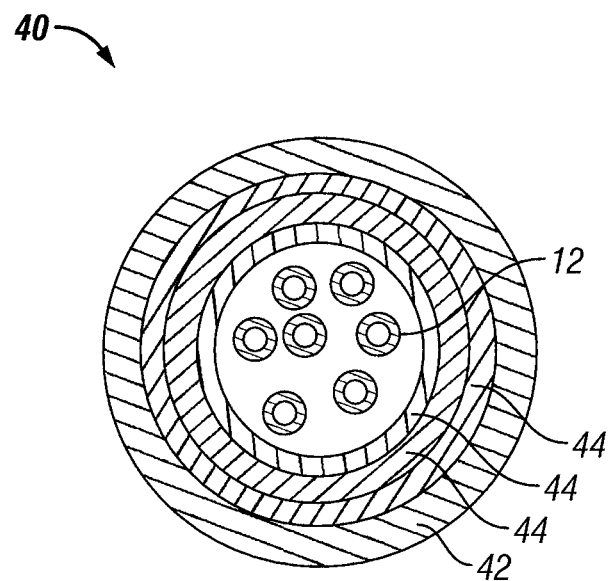
FIG. 3 is a cross-sectional view of an optical fiber element in accordance with the teachings of the present disclosure.

Referring to FIG. 3, an alternate optical fiber element according to the teachings of the present disclosure is illustrated and generally illustrated by reference number 40. The optical fiber element 40 includes a plurality of optical fibers 12 (only one indicated) and a tube 42 within which the plurality of optical fibers 12 are loosely received. The tube 42 has a multi-layer structure and includes a plurality of tubular bodies 44 disposed one inside the other in a concentric configuration. The plurality of tubular bodies 44 are "floatingly" received one inside the other so that when a bending or tensile force is applied to the optical fiber element 40, the tubular bodies 44 can slide along a central axis of the optical fiber element 40 relative to the adjacent tubular bodies 44 to prevent the tensile and/or bending force from being transmitted to the optical fibers 12. Therefore, this multi-layered configuration further improves mechanical strength and fatigue life of the optical fiber element 40.

The number of the tubular bodies 44 is not limited to four as shown in FIG. 3. Further, while not shown in FIG. 3, an intermediate layer as described in connection with FIG. 2 can be provided between adjacent tubular bodies 44 to facilitate the sliding movement of the tubular bodies 44.

Figure 4:
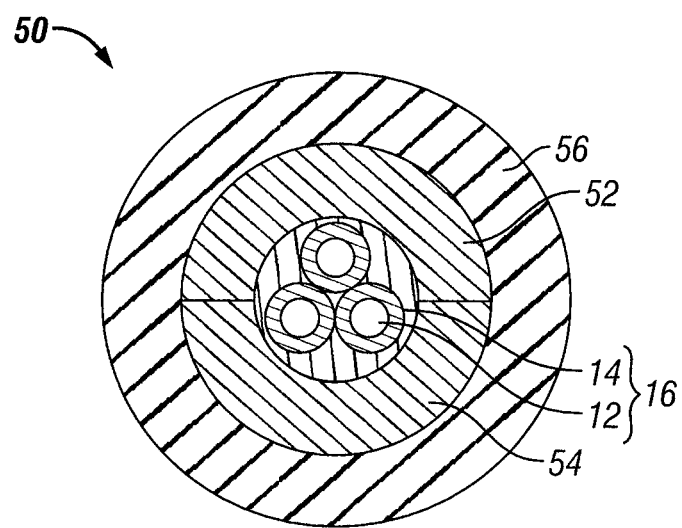
FIG. 4 is a cross-sectional view of an optical fiber element in accordance with the teachings of the present disclosure.

Referring to FIG. 4, an alternate optical fiber element according to the teachings of the present disclosure is illustrated and generally indicated by reference number 50. The optical fiber element 50 includes a plurality of optical fiber ensembles 16 (only one indicated), a body including a first portion 52 and a second portion 54. The first and second portions 52 and 54 are made of metal or polymers and surround the optical fiber cores 16 which include an optical fiber 12 and an insulating coating 14 such as carbon by way of non-limiting example. The optical fiber ensembles 16 are tightly clamped by the first and second portions 52 and 54 and cannot freely move therein. An outer polymer layer 56 is extruded over the first and second portions 52 and 54 to secure them in place. The outer polymer layer 56 also serves as an insulation. The number of the optical fiber ensembles 16 is not limited to three as shown in FIG. 4.

While FIG. 4 shows an optical fiber element, it should be understood that that one or more of the optical fiber ensembles 16 can be replaced with one or more electrical components or opto-electrical components to form an electrical element, or a hybrid opto-electrical cable.

Hybrid Opto-Electrical Cable Element

Figure 5:
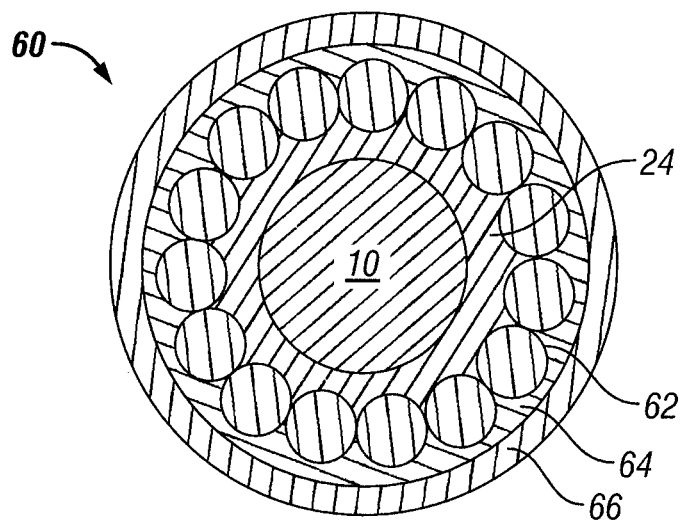
FIG. 5 is a cross-sectional view of an optical fiber element in accordance with the teachings of the present disclosure.

Referring to FIG. 5, a hybrid opto-electrical element assembly is illustrated and generally indicated by reference number 60. The hybrid opto-electrical element 60 includes an optical fiber component 10 as previously described in connection with FIG. 1, a plurality of electrical conductors 62 (only one indicated) surrounding the optical fiber component 10, a first polymer layer 64 surrounding the plurality of electrical conductors 62, and a second polymer layer 66 surrounding the first polymer layer 64. Since the construction of the optical fiber component 10 has been described in connection with FIG. 1, the description thereof is omitted herein for clarify.

The plurality of electrical conductors 62 are preferably in the form of a plurality of copper wires or nickel coated copper wires. The plurality of electrical conductors 62 are helically wrapped around the optical fiber component 10 and are partially embedded into the outer silicone layer 24 of the optical fiber component 10.

The first polymer layer 64 is extruded over the plurality of electrical conductors 62 and the second polymer layer 66 is extruded over the first polymer layer 64. The materials for the first polymer layer 64 and the second polymer layer 66 are properly chosen to increase mechanical strength for the hybrid opto-electrical cable and provide the required electrical properties, such as crosstalk avoidance, electromagnetic interference avoidance.

Cable Module

Figure 6:
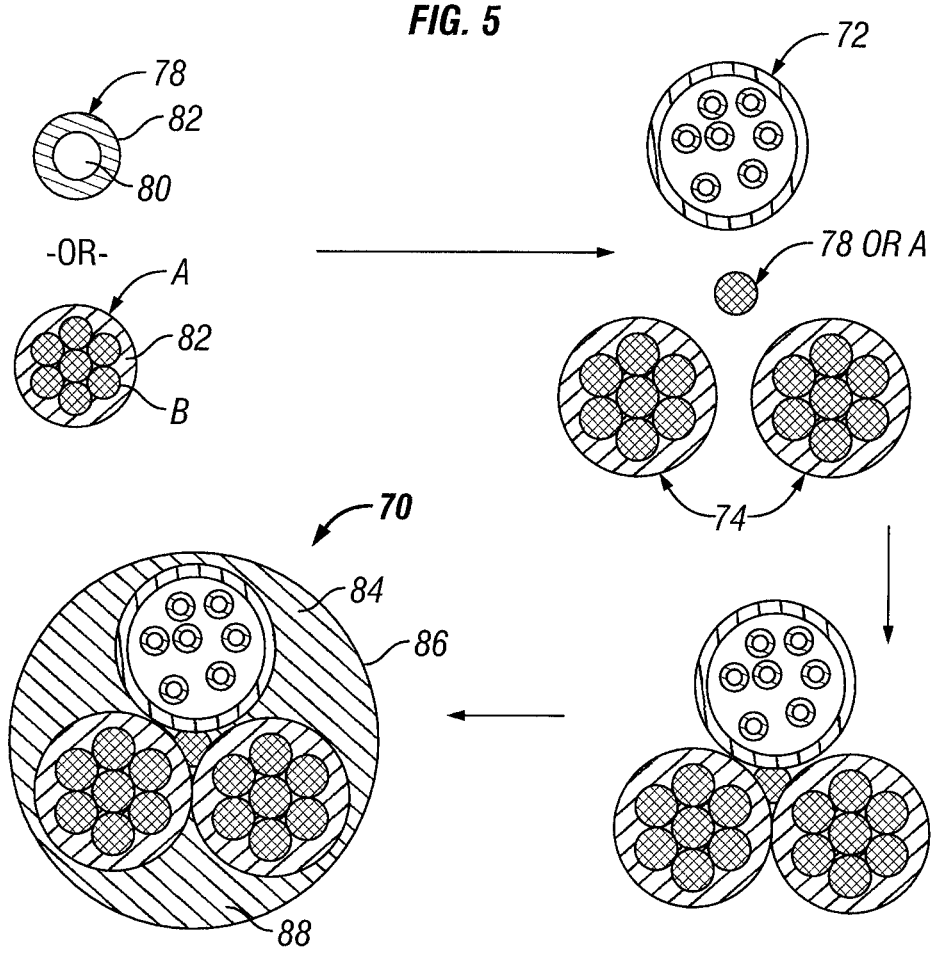
FIG. 6 is a cross-sectional view of a cable module, illustrating sequential steps of manufacturing the modular cable assembly.

Referring to FIG. 6, an opto-electrical cable module is illustrated and is generally indicated by reference numeral 70. The opto-electrical cable module 70 includes a primary cable package having only three primary cables arranged in a triad configuration, i.e., the primary cables have substantially equal outside diameters and are adjoined to form a substantially triangular tangent periphery. Tangent periphery is defined by the three tangent lines to the three primary cables. A cable module having such a triad configuration has an improved mechanical strength. In this illustrative example, the three primary cables include an optical fiber element 72 and two power conductor cable elements 74. The optical fiber element 72 has a "floating tube" construction similar to the optical fiber elements 30 and 40 of FIGS. 2 and 3. The power conductor elements 74 are standard electrical conductor assemblies each including a plurality of electrical conductors 76 surrounded by an insulation layer 88. The optical fiber element 72 and the power conductor elements 74 are properly arranged to surround a filler element or rod 78 and form a substantially triangular triad configuration. The filler element or rod 78 may include a highly twisted synthetic yarn 80 and a soft deformable polymer 82 extruded over the yarn 80. Another embodiment for the filler module includes a standard electrical conductor "A" composed of a plurality of electrical conductors "B" (only one indicated). The electrical conductor "A" is extruded with a soft deformable polymer 82. An outer polymer layer 84 is extruded over the three elements 72 and 74 to form a circular cross-section having an outer periphery 86.

The manufacturing process of the cable module 70 is now described in more detail. First, a central filler element 78 and three primary elements including one optical fiber element 72 and two electrical conductor assemblies 74 are provided. The power electrical conductors 74 and the optical fiber element 72 are cabled helically around the central filler element 78 or A. As the optical fiber element 72 and the two electrical power conductor elements 74 are wrapped around the filler element 78, the deformable polymer 82 of the filler element 78 is deformed to fill the interstitial space between the three elements 72 and 74. The filler element 78 may be softened by heating to ease the deformation.

After the three elements 72 and 74 are provided around the filler element 78 and the filler element 78 is deformed, a casing, preferably a soft polymer layer 84, is extruded over the cabled conductors to create a circular cross-section having an outer periphery 86. The outer periphery 86 is close to the outer periphery defined by the three elements 72 and 74 so that the interstitial spaces 88 defined by the outer periphery 86 and the cables 72 and 74 are smaller than the elements 72 and 74 and there is no room for an element larger than the three elements 72 and 74 to be disposed in the interstitial spaces 88 (only one indicated).

The opto-electrical cable module 70 has limited electrical power capabilities due to the small size of the optical fiber element 72 and the electrical power elements 74 and is thus suitable for low-power applications. The opto-electrical cable module 70 can be used alone or in combination with other cable assemblies or cable modules to form a larger modular cable unit with enhanced electrical properties, which will be described in more detail below.

Modular Cable Unit

Referring to FIG. 7, a modular opto-electrical cable unit according to the teachings of the present disclosure is illustrated and generally indicated by reference numeral 90. The modular opto-electrical cable unit 90 includes a first cable module 92, a second cable module 94 and a third cable module 96 having substantially equal outside diameters and being arranged in a triad configuration. The first, second and third cable modules 92, 94, and 96 are interchangeable and are properly selected to achieve a modular cable unit 90 having desired telemetry, electrical properties and mechanical strength, etc.

More specifically, the first cable module 92 is an opto-electrical assembly having a construction similar to the cable module described in connection with FIG. 6. The second cable module 94 and the third cable module 96 are electrical power conductor assemblies. The electrical power conductor modules 94 and 96 have a configuration similar to that of the low-power conductor elements 74 described in FIG. 6, except that the high-power conductor modules 94 and 96 include larger high power electrical conductors 98 (only one indicated) with higher power capabilities. As a result, the modular cable unit 90 can be used in higher power applications. The first, second and third cable modules 92, 94 and 96 are surrounded by a casing, preferably a polymer layer 99, to form a modular unit.

Since the modular cable unit 90 has a construction similar to the cable module 70, like elements are indicated by like reference numerals and the description thereof is omitted for clarity. The manufacturing process is also similar to that described in connection with FIG. 6, and the description thereof is also omitted.

Referring to FIG. 8, an alternate modular opto-electrical cable unit in accordance with the teachings of the present disclosure is illustrated and generally indicated by reference numeral 100. The modular electro-optic cable unit 100 has a configuration similar to that of the modular electro-optic cable unit 90 and includes a first cable module 102, a second cable module 104 and a third cable module 106. The first cable module 102 is a "floating tube type" optical cable 102 and includes a plurality of optical fibers 12 (only one indicated) and a tube 106 within which the plurality of optical fibers 12 are loosely received.

The optical fiber cable 102 has a construction similar to the optical fiber elements 30 and 40 of FIGS. 2 and 3 except that the tube 106 has a larger diameter to carry more optical fibers 12 and to match the diameters of the second and third cable modules 104 and 106. By using a floating type optical fiber module 102 instead of the opto-electrical module 92, the modular cable unit 100 has higher optical and telemetry capabilities.

The modular cable unit 100 further includes two lower electrical power conductor assemblies 108 disposed in the interstitial spaces defined between the first, second, third cable modules 102, 104 and 106 and the outer periphery 110 of the outer polymer layer 109 so that the power capabilities are maintained while the telemetry capabilities are improved. The remaining interstitial space between the second cable module 104 and the third cable module 106 can be further filled by an additional optical fiber element or an electrical power element to further improve the telemetry or power requirements.

While not shown in FIG. 8, the floating tube can be replaced with a stranded electro-optical element 60 of FIG. 5, the optical fiber element 50 with protective first and second portions as shown in FIG. 4, to change the telemetry and electrical characteristics of the modular unit. Regardless of how the first cable module is interchanged, the outside diameter of the first cable module should be substantially equal to the diameters of the second and the third cable modules 104 and 106 so that the first, second and third cable modules 102, 104, 106 form a substantially triangular tangent periphery. Preferably, the first, second and third cable modules 102, 104 and 106 are so arranged that the centers of the first, second and third cable modules 102, 104, 106 constitute the apexes of an equilateral triangle.

Referring to FIG. 9, an alternate modular electro-optic cable unit according to the teachings of the present disclosure is illustrated and generally indicated by reference numeral 110. The modular cable unit 110 includes a first cable module 112, a second cable module 114 and a third cable module 116 having equal outside diameters and arranged in a triad configuration. The first cable module 112 is a floating tube optical fiber module. The second and third cable modules 114 and 116 are shielded coaxial electrical cable assemblies 112. Two electrical power cable modules 118 are provided in the interstitial spaces. With this construction, the cable module 110 provides two electrical shielded telemetry paths in addition to the optical telemetry in the opto-electric module. The lower data rate electrical telemetry can be used as a backup.

Referring to FIG. 10a, an alternate modular electro-optic cable unit is illustrated and generally indicated by reference numeral 120. The modular opto-electrical cable unit 120 includes a first cable module 122, a second cable module 124 and the third cable module 126 of equal outside diameter and arranged in a substantially triangular configuration. The first cable module 122 is a hybrid opto-electrical module similar to that described in FIG. 6. The second cable module 124 and the third cable module 126 are shielded high-power cable assemblies. The first, second, and third cable modules 122, 124 and 126 are surrounded by a casing, preferably, a polymer layer 128. Since the first cable module 122 is a hybrid opto-electrical module with power transmission capabilities, the electrical power conductor modules provided in the interstitial spaces can be eliminated. The interstitial spaces defined between the first, second, third cable modules and the outer periphery of the polymer layer provide room for additional smaller conductors or conductor modules, depending on the required telemetry, electrical requirements of different applications.

In yet another embodiment, illustrated in FIG. 10b, another alternate modular electro-optic cable unit is illustrated and generally indicated by reference numeral 121. The modular opto-electrical cable unit 121 includes a first cable module 112 (as described above and shown in FIG. 9), a second cable module 125 and the third cable module 127 of equal outside diameter and arranged in a substantially triangular configuration. The first, second, and third cable modules 112, 125 and 127 are surrounded by a casing, preferably, a polymer layer 129.

Cable Modules/Modular Cable Unit with Strength Member

When in use, the cable modules 70 of FIG. 6 or the modular cable units 90, 100, 110, 120 of FIGS. 7, 8, 9, 10a, and 10b can be enclosed by a strength member to improve the mechanical strength.

Referring to FIG. 11, the modular cable unit 90 of FIG. 7 is protected by a strength member 130, which provides the required mechanical strength. The strength member 130 includes a first wire assembly 132 and a second wire assembly 134 arranged helically relative to the central axis of the modular cable unit 90. The first armor wire assembly 132 is wrapped in a helical direction and the second armor wire assembly 134 is wrapped in a counter-helical direction. The first layer of armor wire can be in the same lay direction as the modules inside the modular cable unit 90 or can be laid in the opposite direction.

Referring to FIG. 12, the modular cable unit 90 of FIG. 7 can be used with a armoring system 140. The armoring system 140 includes, in the order from inside to outside, a reinforced polymer composite 142, a first strength element 144, a first polymer layer 146, a second strength element 148 and a second polymer layer 150. Preferably, the reinforced polymer composite 142 is a fiber reinforced polymer composite, and more preferably, a short-fiber-reinforced polymer composite.

The first strength element 144 is in the form of armor wires which are wrapped at a lay angle and are partially embedded into the short-fiber-reinforced polymer 142. The first polymer layer 146 is also short-fiber-reinforced and is extruded over first strength element 144 in order to encase it. The second strength element 148 is in the form of armor wires and is wrapped helically in a direction counter to the direction of the first strength element 144. The second strength element 148 is partially embedded into the first polymer layer 146.

The second polymer layer 150 is also short-fiber-reinforced and extruded over the second strength element 148 to encase. The second polymer layer 150 bonds to the first polymer layer 146 through gaps between the second strength element 148. An outer layer (not shown) having a small thickness and made of virgin polymer material can be applied cover the second polymer layer 150 to create a smooth surface.

Referring to FIG. 13 which clearly shows that the cable assemblies that make up a modular cable unit can be used individually, depending on the applications. As shown, the modular cable unit 160 includes a first cable module 162, a second cable module 164 and a third cable module 166. The first cable module 162 is a hybrid opto-electrical module. The second cable module 164 is an electrical power module. The third cable module 166 is a mono or coax electrical conductor. These cable modules 162, 164, and 166 can be individually enclosed by an armoring system 140 to suit specific applications.

According to the teachings of the present disclosure, since the cable assemblies are made as cable modules and are used interchangeably, it is relatively easy to form modular cable units with different telemetry, electrical properties to suit a wide variety of applications.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cable module, comprising:
   a primary cable package including only three primary conductor elements of substantially equal diameters, the three primary conductor elements being adjoined to form a substantially triangular tangent periphery, the primary conductor elements defining a central space between each of the primary conductor elements and interstitial spaces between the adjoining primary conductor elements;
   a filler rod element disposed in the central space and surrounded by the three primary elements, wherein the filler rod element comprises a twisted synthetic yarn and a soft deformable polymer extruded over the yarn, the soft deformable polymer deforming to fill the central space;
   at least one secondary conductor disposed in any of the interstitial spaces and having a smaller diameter than the primary conductor elements; and
   a casing enclosing the primary conductor package.

2. A modular cable unit, comprising:
   a plurality of cable modules wherein the cable modules are arranged in a triad configuration, wherein one of the cable modules is an opto-electrical assembly, and the other cable coble modules are electrical power conductor modules;
   a casing encasing, surrounding, and in contact with each of the plurality of cable modules,
   wherein the cable modules are interchangeable and are selected to achieve predetermined telemetry capabilities and electrical power conductor capabilities.

3. The modular cable unit of claim 2, wherein the plurality of cable modules have substantially equal diameters.

4. The modular cable unit of claim 2, wherein the plurality of cable modules comprises three cable modules defining a substantially triangular tangent periphery and defining a central portion therebetween.

5. The modular cable unit of claim 4, further comprising a filler rod module or insulated conductor module, disposed in the central portion and surrounded by the three cable modules.

6. The modular cable unit of claim 2, wherein the plurality of cable modules are selected from a group consisting of optical fiber cable modules, power conductor cable modules, shielded conductor cable modules, hybrid opto-electrcial cable modules and combinations thereof.

7. The modular cable unit of claim 2, further comprising at least one secondary conductor module, wherein the plurality of cable modules define interstitial spaces between the adjoining cable modules and the at least one secondary conductor module is disposed in any of the interstitial spaces.

8. The modular cable unit of claim 7, wherein the at least one second cable module is selected from a group consisting of an optical fiber cable module, an optical fiber cable element, a power conductor element, a power conductor assembly.

9. The modular cable unit of claim 2, further comprising a strength member surrounding the casing.

10. The modular cable unit of claim 2, wherein the casing is a made of a polymer.

11. A method of manufacturing a modular cable unit, comprising:
    preparing a plurality of cable modules having different telemetry, optical and electrical characteristics, wherein the cable modules are arranged in a triad configuration and wherein a central space is formed between the cable modules, and further disposing a filler rod element in the central space, wherein the filler rod element comprises a twisted synthetic yarn and a soft deformable polymer extruded over the yarn, the soft deformable polymer deforming to fill the central space; and
    encasing the plurality of cable modules in a casing to form a modular cable unit having predetermined telemetry characteristics, optical characteristics and electrical power conductor characteristics, the casing surrounding and in contact with each of the plurality of cable modules.

12. The method of manufacturing a modular cable unit of claim 11, wherein the plurality of cable modules are interchangeable.

13. The method of manufacturing a modular cable unit of claim 11, further comprising preparing three cable modules to form a primary cable package having a substantially triangular tangent periphery and defining a central portion therebetween.

14. The method of manufacturing a modular cable unit of claim 11, wherein adjoining comprises extruding a polymer layer over the cable modules to form the casing.

* * * * *